United States Patent
Chiu et al.

(10) Patent No.: US 10,732,254 B2
(45) Date of Patent: Aug. 4, 2020

(54) CHANNEL-BASED POSITIONING DEVICE, CHANNEL-BASED POSITIONING SYSTEM AND CHANNEL-BASED POSITIONING METHOD

(71) Applicant: Industrial Technology Research Institute, Hsinchu (TW)

(72) Inventors: Pi-Chen Chiu, Hsinchu (TW); Ting-Wu Ho, Hsinchu (TW); Chia-Lung Liu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 356 days.

(21) Appl. No.: 15/841,870

(22) Filed: Dec. 14, 2017

(65) Prior Publication Data

US 2019/0146052 A1    May 16, 2019

(30) Foreign Application Priority Data

Nov. 13, 2017    (TW) .............................. 106139175 A

(51) Int. Cl.
*G01S 3/72*    (2006.01)
*G01S 5/02*    (2010.01)
(Continued)

(52) U.S. Cl.
CPC .................. *G01S 3/72* (2013.01); *G01S 3/50* (2013.01); *G01S 3/60* (2013.01); *G01S 5/0215* (2013.01);
(Continued)

(58) Field of Classification Search
CPC combination set(s) only.
See application file for complete search history.

(56) References Cited

U.S. PATENT DOCUMENTS 9,813,867 B2    11/2017 Prevatt
10,348,394 B1 *    7/2019 Bakr .................. H04B 7/18504
(Continued)

FOREIGN PATENT DOCUMENTS

CN    105188082 A    12/2015
CN    105611627 A    5/2016
(Continued)

OTHER PUBLICATIONS

Wang et al., "CSI-based Fingerprinting for Indoor Localization: A Deep Learning Approach," IEEE Transactions on Vehicular Technology 66.1: 763-776 (2017).
(Continued)

*Primary Examiner* — Mamadou L Diallo
(74) *Attorney, Agent, or Firm* — Mintz Levin Cohn Ferris Glovsky and Popeo, P.C.; Peter F. Corless; Steven M. Jensen

(57) ABSTRACT

The disclosure provides a channel-based positioning device, a channel-based positioning system and a channel-based positioning method. The channel-based positioning method includes: calculating a plurality of angles of arrival (AoA), a plurality of angles of departure (AoD) and a plurality of time of flight (ToF) of signals according to a plurality of channel state information transmitted from a terminal apparatus to a base station; determining a path type of the signals according to the plurality of AoA, AoD and ToF of the signals; and calculating a position information of the terminal apparatus relative to the base station through a specific algorithm.

24 Claims, 12 Drawing Sheets

(51) Int. Cl.

| | | |
|---|---|---|
| *G01S 5/06* | (2006.01) | |
| *H04B 7/024* | (2017.01) | |
| *H04B 7/0413* | (2017.01) | |
| *G01S 3/50* | (2006.01) | |
| *G01S 3/60* | (2006.01) | |
| *H04B 7/06* | (2006.01) | |
| *H04W 4/02* | (2018.01) | |
| *H04W 64/00* | (2009.01) | |

(52) U.S. Cl.
CPC .............. *G01S 5/0273* (2013.01); *G01S 5/06* (2013.01); *H04B 7/024* (2013.01); *H04B 7/0413* (2013.01); *H04B 7/0626* (2013.01); *H04W 4/023* (2013.01); *H04W 64/003* (2013.01); *H04W 64/006* (2013.01)

(56) References Cited

U.S. PATENT DOCUMENTS

| | | | |
|---|---|---|---|
| 2006/0023656 A1* | 2/2006 | Anglin, Jr. ........... H04W 72/005 | |
| | | | 370/328 |
| 2010/0323723 A1 | 12/2010 | Gerstenberger et al. | |
| 2013/0196680 A1* | 8/2013 | Soliman .............. H04W 64/003 | |
| | | | 455/456.1 |
| 2014/0327579 A1 | 11/2014 | Hart et al. | |
| 2015/0087331 A1 | 3/2015 | Yang et al. | |
| 2016/0014746 A1* | 1/2016 | Ode .................. H04W 72/0453 | |
| | | | 370/330 |
| 2016/0066158 A1 | 3/2016 | Xiao et al. | |
| 2016/0073372 A1 | 3/2016 | Sen et al. | |
| 2016/0334498 A1 | 11/2016 | Jamieson et al. | |
| 2017/0227625 A1* | 8/2017 | Markhovsky ........... G01S 1/042 | |
| 2018/0100916 A1* | 4/2018 | Gullicksen ........... G01S 5/0226 | |
| 2018/0309549 A1* | 10/2018 | Papadopoulos ....... H04L 5/0048 | |
| 2018/0310290 A1* | 10/2018 | Shimezawa ......... H04W 72/042 | |
| 2019/0045397 A1* | 2/2019 | Mueck ................... H04L 5/001 | |
| 2019/0223140 A1* | 7/2019 | Grossmann ........... G01S 5/0273 | |
| 2019/0285722 A1* | 9/2019 | Markhovsky ........... G01S 19/05 | |

FOREIGN PATENT DOCUMENTS

| | | |
|---|---|---|
| CN | 105933867 A | 9/2016 |
| CN | 106658713 A | 5/2017 |
| CN | 107015198 A | 8/2017 |

OTHER PUBLICATIONS

C. Chen et al., "High accuracy indoor localization: A WiFi-Based Approach," IEEE International Conference on Acoustics, Speech and Signal Processing, 2016, pp. 6245-6249.

M. Kotaru, et al., "SpotFi: Decimeter Level Localization Using WiFi," Special Interest Group on Data Communication, 2016, pp. 269-282.

Y. Chapre, et al., "CSI-MIMO: Indoor Wi-Fi fingerprinting system," IEEE Conference on Local Computer Networks, 2014, pp. 202-209.

F. Adib et al., "Multi-Person Localization via RF Body Reflections," USENIX Symposium on Networked Systems Design and Implementation, 2015, pp. 279-292.

J. Xiong and K. Jamieson, "ArrayTrack: A Fine-Grained Indoor Location System," USENIX Symposium on Networked Systems Design and Implementation, 2013, pp. 71-84.

J. Xiao et al., "FILA: Fine-grained Indoor Localization," IEEE International Conference on Computer Communication, 2012, pp. 1-9.

D. Vasisht et al., "Decimeter-Level Localization with a Single WiFi Access Point," USENIX Symposium on Networked Systems Design and Implementation, 2016, pp. 165-178.

J. Li et al., "A Novel Method of Wi-Fi Indoor Localization based on Channel State Information," IEEE International Conference on Wireless Communications and Signal Processing, 2016, pp. 1-5.

* cited by examiner

US 10,732,254 B2

CHANNEL-BASED POSITIONING DEVICE, CHANNEL-BASED POSITIONING SYSTEM AND CHANNEL-BASED POSITIONING METHOD

CROSS-REFERENCE TO RELATED APPLICATION

The present disclosure is based on, and claims priority from, Taiwan Application Number 106139175, filed Nov. 13, 2017, the disclosure of which is hereby incorporated by reference herein in its entirety.

BACKGROUND

1. Technical Field

The present disclosure relates to positioning devices, positioning systems and positioning methods, and, more particularly, to a channel-based positioning device, a channel-based positioning system and a channel-based positioning method that require only a terminal apparatus and a single base station.

2. Description of Related Art

Global Positioning System (GPS) provides accurate, convenient and fast positioning. With the popularity of smart phones, GPS has more applications. However, due to the limitation of its technical principle, the positioning accuracy of this positioning technology in the indoor environment is often not satisfactory. Therefore, a Wi-Fi indoor positioning method has been proposed.

This traditional Wi-Fi indoor positioning method involves calculating the distance by analyzing parameters of the signal in the propagation process, such as the received signal strength (RSS) and so on. However, in this indoor positioning method, differences of the received signal strengths under different circumstances will increase errors in positioning. Thus, a Channel State Information (CSI) positioning method was developed. This CSI positioning method uses parameters such as Angle of Arrival (AoA) and Time of Flight (ToF) of the signals. However, the existing CSI positioning method must use at least three base stations to calculate the position of the terminal apparatus to reduce the positioning error and improve the accuracy. If only one base station is used, positioning errors may be too large to satisfy indoor positioning requirements, and signal strengths may be need to be re-measured when there is a change in the indoor environment.

SUMMARY OF THE DISCLOSURE

A channel-based positioning device is provided, which may include: a receiving module configured for receiving a plurality of channel state information (CSI) of a plurality of signals transmitted by a terminal apparatus to a base station; a calculating module configured for calculating a plurality of angles of departure (AoD), a plurality of angles of arrival (AoA) and a plurality of time of flight (ToF) of the plurality of signals of the terminal apparatus relative to the base station based on the plurality of CSI; a path type determining module configured for determining a path type of the plurality of signals based on the plurality of AoD, the plurality of AoA and the plurality of ToF; and a positioning module configured for calculating position information of the terminal apparatus relative to the base station based on the path type of the plurality of signals.

The present disclosure also provides a channel-based positioning system, which may include: a base station; a terminal apparatus configured for transmitting a plurality of signals to the base station for the base station to obtain a plurality of channel state information (CSI); and a positioning device, including: a receiving module configured for receiving the plurality of CSI; a calculating module configured for calculating a plurality of angles of departure (AoD), a plurality of angles of arrival (AoA) and a plurality of time of flight (ToF) of the plurality of signals of the terminal apparatus relative to the base station based on the plurality of CSI; a path type determining module configured for determining a path type of the plurality of signals based on the plurality of AoD, the plurality of AoA and the plurality of ToF; and a positioning module configured for calculating position information of the terminal apparatus relative to the base station based on the path type of the plurality of signals.

The present disclosure further provides a channel-based positioning method, which may include: obtaining a plurality of channel state information (CSI) of a plurality of signals transmitted by a terminal apparatus to a base station; calculating a plurality of angles of departure (AoD), a plurality of angles of arrival (AoA) and a plurality of time of flight (ToF) of the plurality of signals of the terminal apparatus relative to the base station based on the plurality of CSI; determining a path type of the plurality of signals based on the plurality of AoD, the plurality of AoA and the plurality of ToF; and calculating position information of the terminal apparatus relative to the base station based on the path type of the plurality of signals.

DETAILED DESCRIPTION OF THE EMBODIMENTS

The present disclosure is described by the following specific embodiments. Those with ordinary skills in the arts can readily understand other advantages and functions of the present disclosure after reading the disclosure of this specification. The present disclosure may also be practiced or applied with other different implementations. Based on different contexts and applications, the various details in this specification can be modified and changed without departing from the spirit of the present disclosure.

Figure 1:
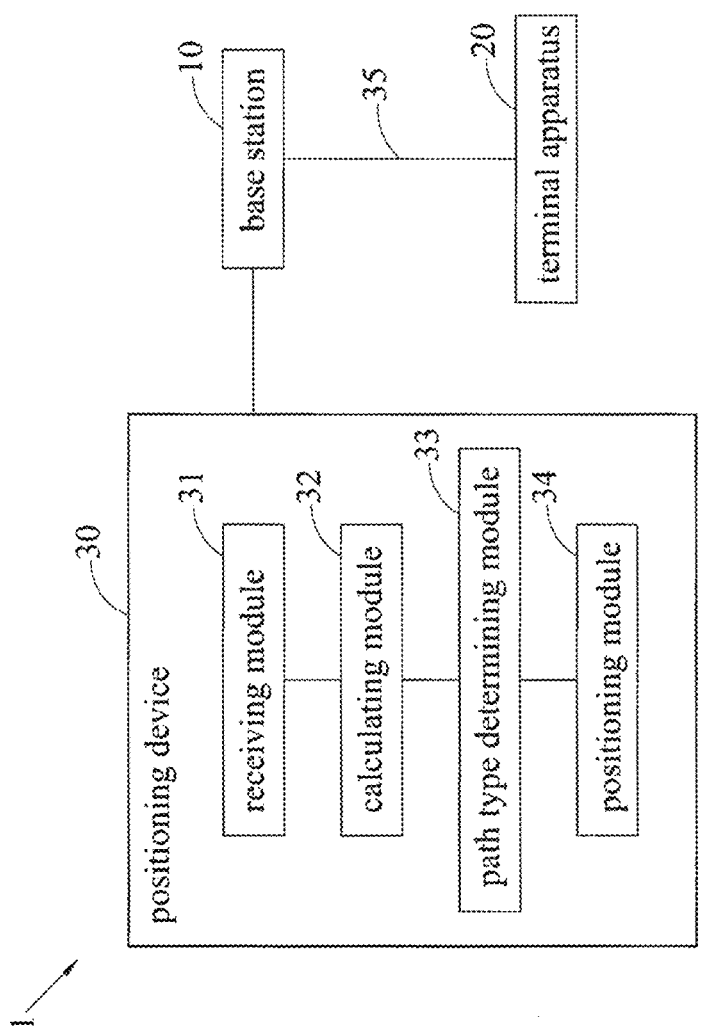
FIG. 1 is a schematic diagram depicting the framework of a channel-based positioning system in accordance with the present disclosure.

Referring to FIG. 1, a schematic diagram depicting a channel-based positioning system 1 and a positioning device 30 thereof in accordance with the present disclosure is shown. The positioning system 1 according to the present disclosure includes a base station 10, a terminal apparatus 20 and the positioning device 30. The positioning device 30 includes a receiving module 31, a calculating module 32, a path type determining module 33 and a positioning module 34.

In an embodiment, the base station 10 can be a Wi-Fi access point (AP) or a base station (BS), or a base station erected by a telecommunication company, and the terminal apparatus 20 can be a smart phone, a tablet and the like. In another embodiment, the positioning device 30 can be a location based service (LBS) server.

Figure 2:
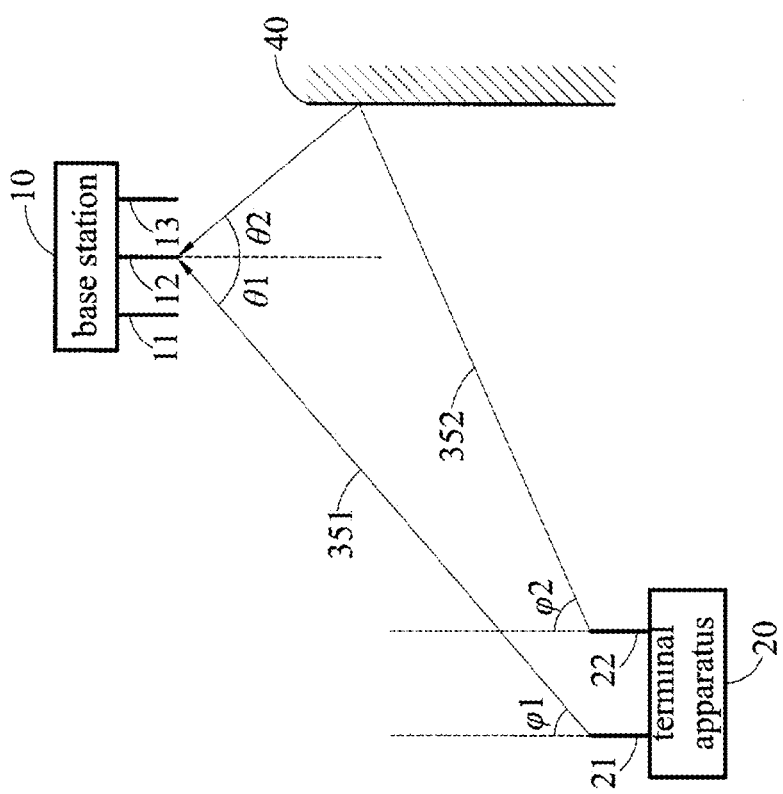
FIG. 2 is a schematic diagram depicting a terminal apparatus transmitting signals to a base station in the positioning system in accordance with the present disclosure.

The terminal apparatus 20 is used for transmitting a plurality of signals 35 to the base station 10, such that the base station 10 obtains a plurality of channel state information (CSI). Refer to FIG. 2 at the same time. In an embodiment, the terminal apparatus 20 includes at least two terminal antennae 21 and 22, and the base station 10 includes at least two base station antennae 11, 12 and 13. The plurality of signals 35 transmitted by the terminal apparatus 20 to the base station 10 may be uplink CSI. Since the terminal apparatus 20 includes at least two terminal antennae 21 and 22 and the base station 10 includes at least two base station antennae 11, 12 and 13, uplink CSI between different terminal antennae and different base station antennae may be different. The base station 10 may simultaneously receive uplink CSI uploaded by a plurality of terminal apparatuses 20. Thus, the base station 10 identifies the uplink CSI between different terminal apparatuses 20 and their different antennae based on identifications (ID) and antenna ports of the terminal apparatuses 20.

As shown in FIG. 2, in an embodiment if the terminal apparatus 20 has two terminal antennae 21 and 22 and the base station 10 includes three base station antennae 11, 12 and 13, the CSI transmitted by the terminal antennae 21 and 22 to the base station antennae 11, 12 and 13 can be represented in a CSI matrix $S_{n,m}$, wherein n indicates the $n^{th}$ antenna of the terminal apparatus 20, and m indicates the $m^{th}$ antenna of the base station 10. Therefore, the CSI matrix transmitted by a terminal antenna to a base station antenna can be, for example, represented as:

$$S_{1,2}=[CSI_1\ CSI_2\ \ldots\ CSI_{30}]$$

In an embodiment, a CSI may also include a Timestamp of each packet and a MAC address of the terminal apparatus 20, and each signal may include 30 sub-carriers.

The plurality of CSI obtained by the base station 10 can then be transmitted to the positioning device 30, such that the receiving module 31 of the positioning device 30 receives the plurality of CSI. In this embodiment, the receiving module 31 is hardware, such as a network interface, a connection port and the like, and the present disclosure does not so limit the type of connection between the receiving module 31 and the base station 10.

In an embodiment, the calculating module 32, the path type determining module 33 and the positioning module 34 in the positioning device 30 are software or firmware implemented by a microprocessor in the positioning device 30. The software can be stored in a storage unit (e.g., a hard disk, a USB, a flash memory or etc.) in the positioning device 30 to be processed by the microprocessor. The firmware can be burnt on a read-only memory to be processed by the microprocessor, but the present disclosure is not limited as such.

Referring to FIG. 2, the calculating module 32 is used for calculating a plurality of angles of departure (AoD), a plurality of angles of arrival (AoA) and a plurality of time of flight (ToF) of signals of the terminal apparatus 20 relative to the base station 10 based on the plurality of CSI, for example, an AoD φ1 of a signal 351 when transmitted from the terminal antenna 21; an AoD φ2 of a signal 352 when transmitted from the terminal antenna 22; an AoA θ1 of the signal 351 when arriving at the base station antenna 12; an AoA θ2 of the signal 352 when arriving at the base station antenna 12; and the like.

In an embodiment, as shown in FIG. 2, the signal 351 travels in a straight line path without being reflected by an obstruction 40 and arrives at the base station antenna 12 directly, while the signal 352 travels in a reflected path in which it is reflected by the obstruction 40 once and then received by the base station antenna 12. The present disclosure does not limit the type of paths taken by the signals 351 and 352. The signals 351 and 352 may both travel in straight line paths or both travel in reflected paths, or one may travel in a straight line path, while the other travels in a reflected path and vice versa. Embodiments about the types of paths will be described in more details later.

Figure 3B:
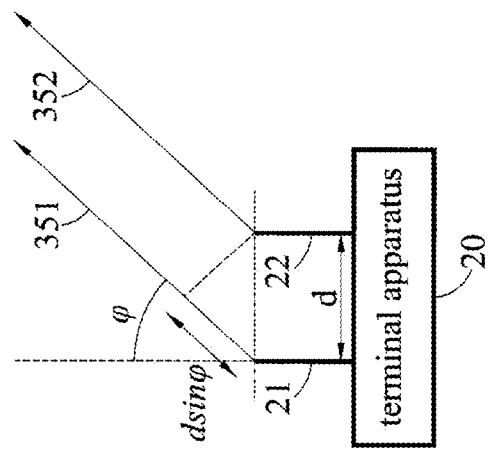
FIG. 3B is a schematic diagram depicting the positioning device in the positioning system calculating angle of departure (AoD) of signals transmitted from the terminal apparatus in accordance with the present disclosure.
Figure 3A:
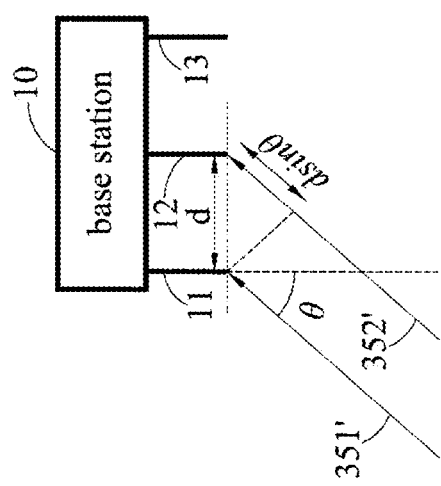
FIG. 3A is a schematic diagram depicting a positioning device in the positioning system calculating angle of arrival (AoA) of signals incident on the base station in accordance with the present disclosure.

In an embodiment, referring to FIG. 3A, a schematic diagram illustrating the calculation of AoA of signals incident on the base station is shown. Assuming the CSI matrix of a signal 351' is $S_{1,1}=[CSI_1\ CSI_2\ \ldots\ CSI_{30}]$, and the CSI matrix of a signal 352' is $S_{1,2}=[CSI_1\ CSI_2\ \ldots\ CSI_{30}]$. The signals 351' and 352' are both transmitted by the same terminal antenna on the terminal apparatus 20 and received by different base station antennae 11 and 12 on the base station 10, respectively. The AoA θ can be calculated based on the equation below:

$$\frac{\Delta \text{phase}}{2\pi} = \frac{d \cdot \sin\theta}{\lambda},$$

wherein Δphase is the phase difference between the CSI matrix $S_{1,1}=[CSI_1\ CSI_2 \ldots CSI_{30}]$ of the signal 351' received by the base station antenna 11 and the CSI matrix $S_{1,2}=[CSI_1\ CSI_2 \ldots CSI_{30}]$ of the signal 352' received by the base station antenna 12 (for example, the phase difference between each $CSI_1$, i.e., the phase difference between the base station antennae); d is the distance between the base station antenna 11 and base station antenna 12, λ is the wavelength (e.g., the wavelength of a 2.4 GHz wave is about 125 mm, the wavelength of a 5.0 GHz wave is about 60 mm); and 2π for expressing in radians (360 degrees).

In an embodiment, referring to FIG. 3B, a schematic diagram illustrating the calculation of AoD of signals transmitted by the terminal apparatus is shown. Assuming the CSI matrix of the signal 351 is $S_{1,1}=[CSI_1\ CSI_2 \ldots CSI_{30}]$ and the CSI matrix of the signal 352 is $S_{2,1}=[CSI_1\ CSI_2 \ldots CSI_{30}]$. The signals 351 and 352 are transmitted by different terminal antennas 21 and 22, respectively, on the terminal apparatus 20 and received by the same base station antenna on the base station 10. The AoD φ can be calculated based on the equation below:

$$\frac{\Delta \text{phase}}{2\pi} = \frac{d \cdot \sin\varphi}{\lambda},$$

wherein Δphase is the phase difference between the CSI matrix $S_{1,1}=[CSI_1\ CSI_2 \ldots CSI_{30}]$ of the signal 351 and the CSI matrix $S_{2,1}=[CSI_1\ CSI_2 \ldots CSI_{30}]$ of the signal 352 transmitted by the terminal apparatus 20 (for example, the phase difference between each $CSI_1$, i.e., the phase difference between the terminal antennae); d is the distance between the terminal antennae 21 and 22, λ is the wavelength (e.g., the wavelength of a 2.4 GHz wave is about 125 mm, the wavelength of a 5.0 GHz wave is about 60 mm); and 2π for expressing in radians (360 degrees).

In an embodiment, the ToF can be calculated based on the phase difference between sub-carriers of a signal transmitted from one of the terminal antennae to one of the at least two base station antennae. For example, the CSI matrix of the signal 351 transmitted by the terminal apparatus 20 to the base station antenna 12 of the base station 10 is $S_{1,1}=[CSI_1\ CSI_2 \ldots CSI_{30}]$, it includes 30 sub-carriers. The ToF of the signal 351 can be calculated according to the equation below:

$$\frac{n \times \left(\frac{c}{f_1} - \frac{c}{f_2}\right)}{\frac{c}{f_2}} = \frac{\Delta \text{phase}}{2\pi}$$

Substitute $$T_1 = \frac{1}{f_1}$$

into the above equation to get:

$$n \times T_1 \times (f_2 - f_1) \times 2\pi = \Delta \text{phase},$$

wherein Δphase is the phase difference between the sub-carriers in the above $S_{1,1}=[CSI_1\ CSI_2 \ldots CSI_{30}]$ (e.g., the phase difference between $CSI_1$ and $CSI_2$); c is the speed of light; $f_1$ and $f_2$ are the frequencies of different sub-carriers (e.g., the frequencies of $CSI_1$ and $CSI_2$); 2π for expressing in radians (360 degrees); n is the number of sub-carrier; and T is the ToF.

Once the plurality of the AoD, the AoA and the ToF of the signals are determined, the path type determining module 33 then determines the types of paths of the signals 351 and 352 based on the plurality of the AoD, the AoA and the ToF. FIGS. 4A to 4D illustrate four embodiments in which the positioning device in the positioning system determines the types of paths of signals in accordance with the present disclosure. The determining method is described in FIG. 8. In the descriptions below, the signals 351 and 352 are used for illustration purpose only, and the present disclosure is not limited to just two signals.

Figure 4A:
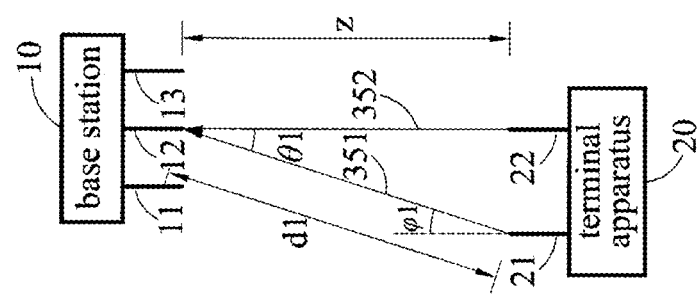
FIG. 4A is a schematic diagram depicting the positioning device in the positioning system determining signals to be of a double-signal direct path type in accordance with the present disclosure.
Figure 4B:
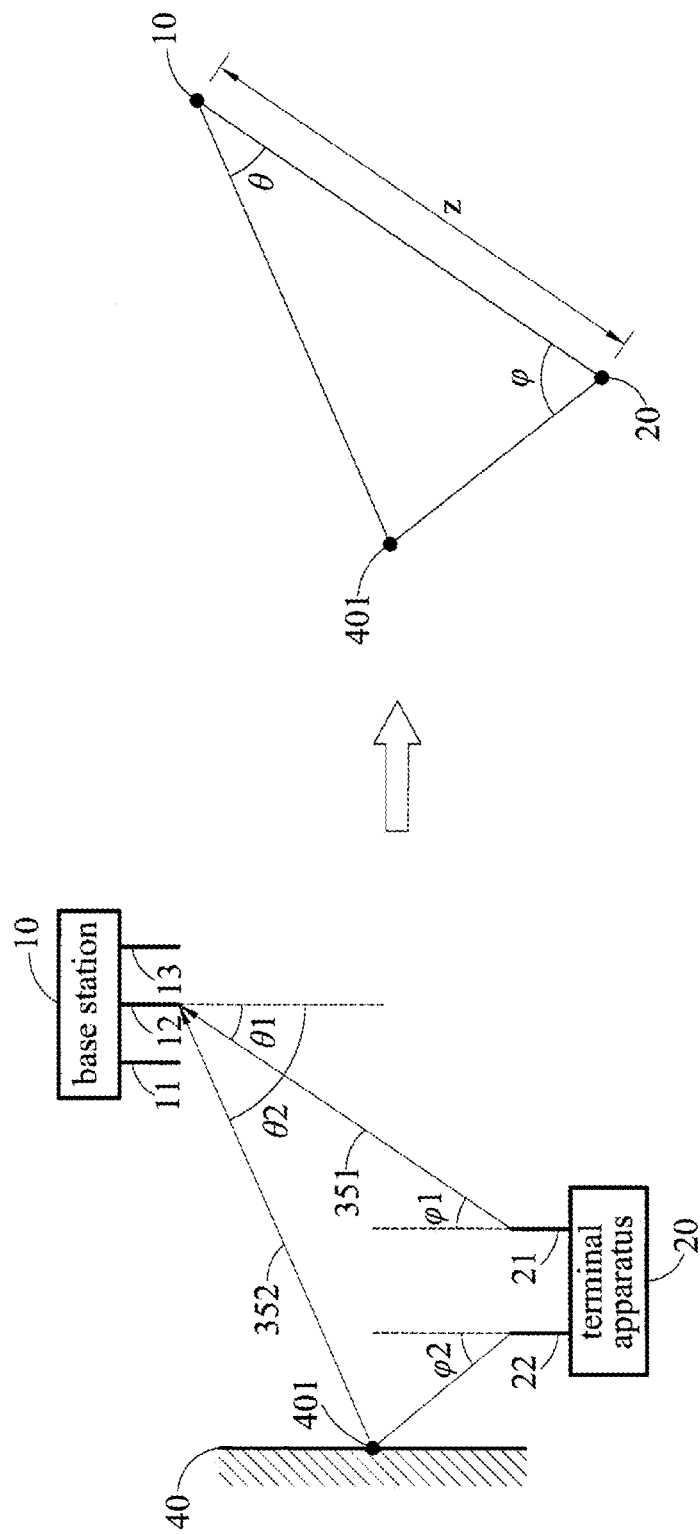
FIG. 4B is a schematic diagram depicting the positioning device in the positioning system determining signals to be of a single-signal reflected path type in accordance with the present disclosure.

First, as shown in step S21, it is determined whether the difference between the AoA θ1 and θ2 of the signals 351 and 352 or the AoD φ1 and φ2 of the signals 351 and 352 (e.g., |θ1−θ2| or |φ1−φ2|) has reached a first threshold. If it has reached the first threshold, step S22 is executed to further determine if the difference between the ToF of the signals 351 and 352 has reached a second threshold. If it has reached the second threshold, the path type determining module 33 determines that the path type of the signals is a single-signal reflected path type, as shown in FIG. 4B, the signal 351 travels in a straight line path without being reflected by the obstruction 40 and arrives at the base station antenna 12 directly, while the signal 352 travels in a reflected path in which it is reflected by the obstruction 40 (reflection point 401) once and then received by the base station antenna 12.

In an embodiment, the first threshold is a range of angles, such as 40 to 80 degrees, 50 to 70 degrees etc. The first threshold may also be a specific angle, such as 60 degrees, but the present disclosure is not limited as such. In addition, the difference between the ToF of the signals 351 and 352 means that the longer one of the ToF of the signals is greater than the shorter one of the ToF of the signals by a specific multiple, and this specific multiple is the second threshold. In an embodiment, this specific multiple (i.e., the second threshold) can be one or two, preferably 1.5. Alternatively, the second threshold can be a range of multiples, for example, between one and two multiples, and the present disclosure is not limited as such.

Figure 4C:
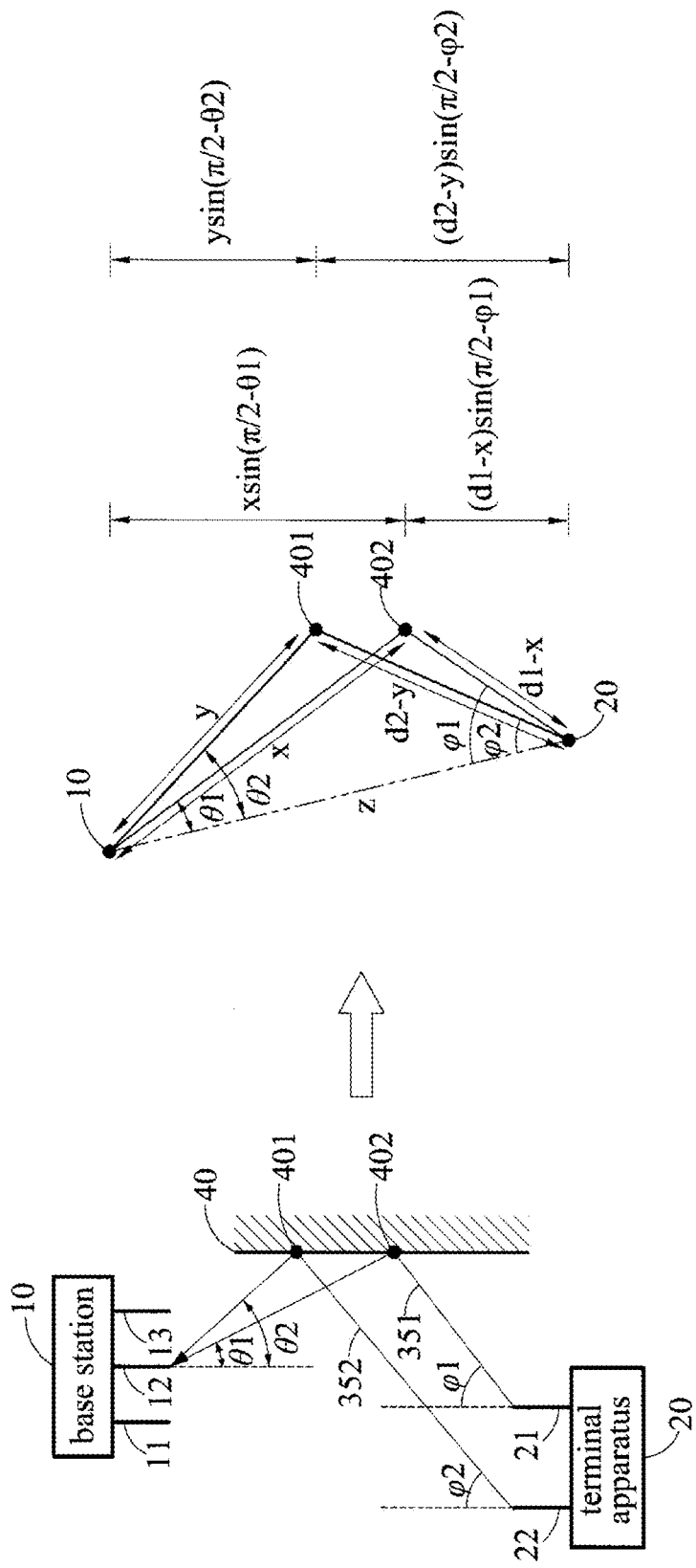
FIG. 4C is a schematic diagram depicting the positioning device in the positioning system determining signals to be of a double-signal same-direction reflected path type in accordance with the present disclosure.
Figure 6B:
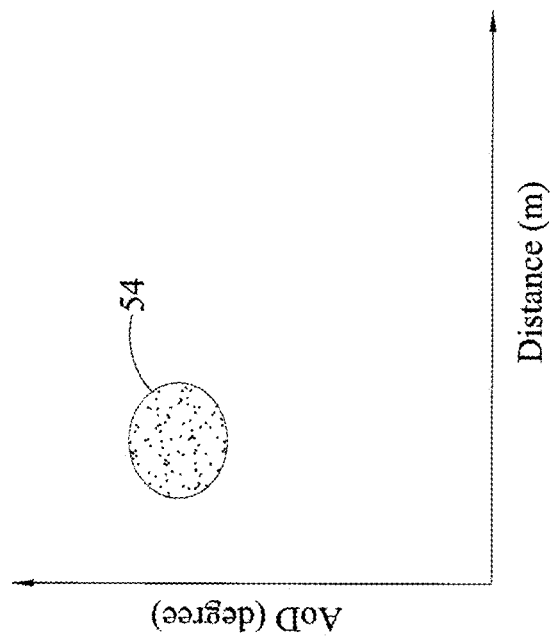
FIG. 6B is a graph depicting a plurality of AoD of signals and their distances drawn in coordinates for determining the signals to be of the double-signal direct path type by the positioning device in the positioning system of the present disclosure.
Figure 6A:
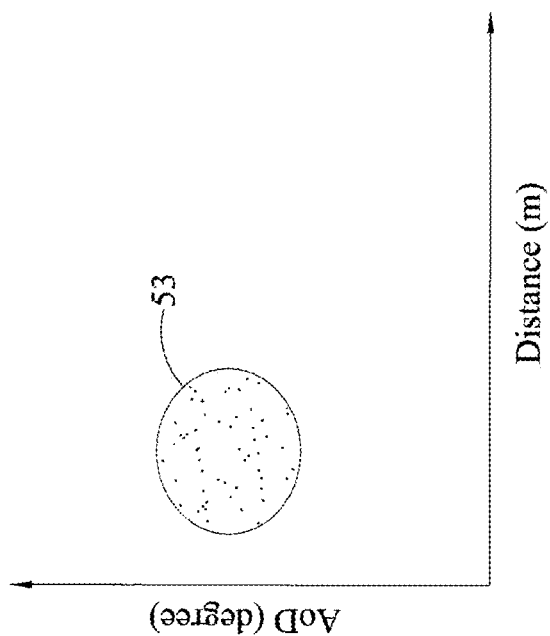
FIG. 6A is a graph depicting a plurality of AoD of signals and their distances drawn in coordinates for determining the signals to be of the double-signal same-direction reflected path type by the positioning device in the positioning system of the present disclosure.

If in step S21, the difference between the AoA θ1 and θ2 of the signals 351 and 352 or the AoD φ1 and φ2 of the signals 351 and 352 (e.g., |θ1−θ2| or |φ1−φ2|) has not reached the first threshold, then proceed to step S23 to determine whether the standard deviation between the AoD φ1 and φ2 of the signals 351 and 352 is large. If so, then the path type determining module 33 may determine that the path type of the signals 351 and 352 belong to a double-signal same-direction reflected path type, as shown in FIG. 4C, the signals 351 and 352 are reflected by the same obstruction 40 (reflection points 401 and 402) once and then received by the base station 10. If not, then the path type determining module 33 determines the path type of the signals 351 and 352 belong to a double-signal direct path type, as shown in FIG. 4A, the signals 351 and 352 directly arrive at the base station 10 without intervening obstructions. Herein, the method for determining the standard deviation is described with respect to FIGS. 6A and 6B, wherein the AoD and the distances (or ToF) are drawn in graphs of coordinates. It can be seen in FIGS. 6A and 6B, a packet cluster 53 is more loosely packed than a packet cluster 54, i.e., the packet cluster 54 is more concentrated than the packet cluster 53. Therefore, the packet cluster 54 (see FIG. 6B) indicates the double-signal direct path type, while the packet cluster 53 (see FIG. 6A) indicates the double-signal same-direction reflected path.

Figure 4D:
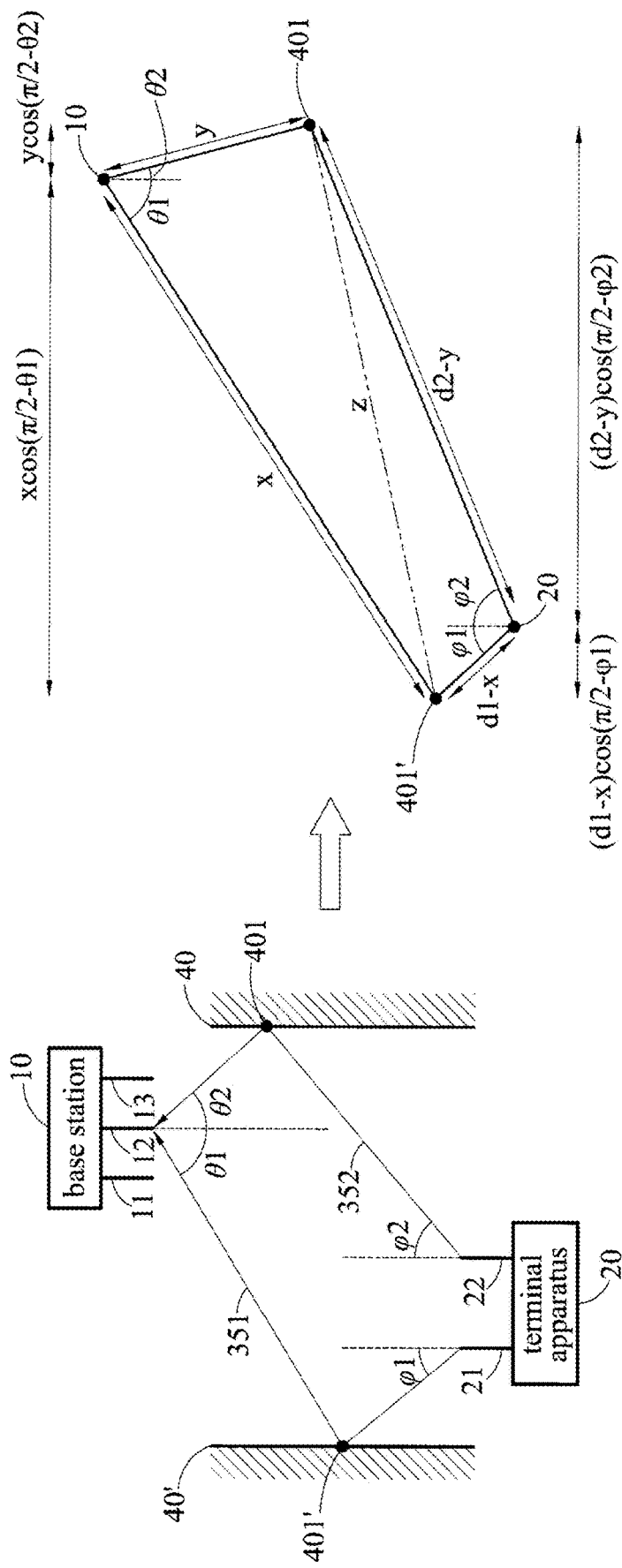
FIG. 4D is a schematic diagram depicting the positioning device in the positioning system determining signals to be of a double-signal opposite-direction reflected path type in accordance with the present disclosure.
Figure 5:
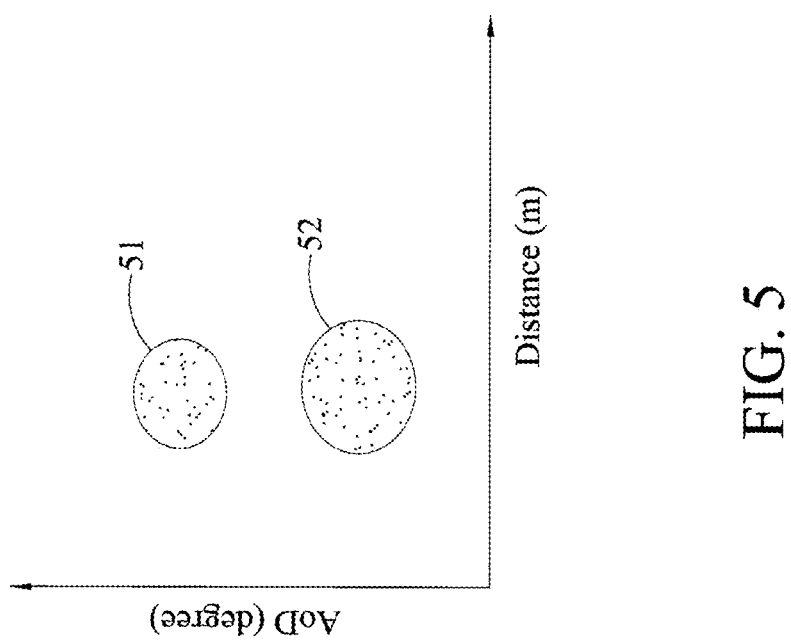
FIG. 5 is a graph depicting a plurality of AoD of signals and their distances drawn in coordinates for determining the signals to be of the double-signal opposite-direction reflected path type by the positioning device in the positioning system of the present disclosure.

If in step S22, the second threshold is not reached, then proceed to step S24 to further determine whether the AoD φ1 and φ2 can be divided into two groups. If so, then the path type determining module 33 determines that the path type of the signals 351 and 352 belong to a double-signal opposite-direction reflected path type, as shown in FIG. 4D, the signal 351 is reflected once by an obstruction 40' (reflection point 401') before arriving at the base station antenna 12, and the signal 352 is reflected once by the obstruction 40 (reflection point 401) before arriving at the base station antenna 12. In other words, this type of path entails that the signals 351 and 352 being reflected by different obstructions 40 and 40'. The above step of determining whether the AoD can be divided into two groups can be seen in FIG. 5, wherein the AoD and the distances (or ToF) are drawn in a graph of coordinates, and if two distinct packet clusters 51 and 52 are shown, then it is determined the AoD of the signals can be divided into two groups, otherwise the opposite is true.

In step S24, since the AoD φ1 and φ2 cannot be divided into two groups, then the path type determining module 33 determines that the path type of the signals 351 and 352 is also the double-signal direct path type as described before with respect to FIG. 4A.

Once the path type determining module 33 has determined the path type of the signals, the positioning module 34 then calculates a position information of the terminal apparatus 20 relative to the base station 10 using a specific algorithm depending on the path type of the signals. Details of the algorithms corresponding to different path types are described below.

Returning to FIG. 4A, the signals 351 and 352 belong to the double-signal direct path type. As an example, the terminal antennae 21 and 22 transmit signals to the base station antenna 12, the vertical distance z between the base station 10 and the terminal apparatus 20 is the position information to be calculated by the positioning module 34. At this time, the connections between the terminal antennae 21 and 22 and the base station antenna 12 can be regarded as a congruent triangle (RHS). Since the AoA θ1 and the ToF of the signal 351 are known, then the distance d1 from the terminal antenna 21 to the base station antenna 12 can be calculated based on the ToF of the signal 351. The distance z can be obtained by the equation below and the position information can be further obtained:

$$z = d_1 \cos(\theta 1).$$

Referring now to FIG. 4B, the signals 351 and 352 belong to the single-signal reflected path type. If the distance between the terminal antennae 21 and 22 of the terminal apparatus 20 is ignored, then the terminal 20, the base station 10 and the reflection point 401 of the obstruction 40 form a congruent triangle with two angles and one included side (ASA), wherein φ is sum of φ1 and φ2, θ is the difference between θ2 and θ1, and the positioning module 34 can calculate the distance z from the ToF of the signal 351 as the position information of the terminal apparatus 20 relative to the base station 10.

Referring to FIG. 4C, the signals 351 and 352 belong to the double-signal same-direction reflected path type. If the distance between the terminal antennae 21 and 22 of the terminal apparatus 20 is ignored, the terminal apparatus 20, the base station 10 and the reflection points 401 and 402 of the obstruction 40 form two three-side congruent triangles (SSS) respectively. Since the AoD φ1, the AoD θ1 and the ToF of the signal 351 are known, the distance d1 of the signal 351 can first be calculated. Assuming the distance of the signal 351 between the base station 10 and the reflection point 402 is x, then the distance of the signal 351 between the reflection point 402 and the terminal apparatus 20 would be d1−x, and the vertical distance between the base station 10 and the reflection point 402 would be x sin(π/2−θ1), and the vertical distance between the reflection point 402 and the terminal apparatus 20 would be (d1−x)sin(π/2−φ1); similarly, the total distance of the signal 352 is d2, assuming the distance of the signal 352 between the base station 10 and the reflection point 401 is y, then the distance of the signal 352 between the reflection point 401 and the terminal apparatus 20 would be d2−y, and the vertical distance between the base station 10 and the reflection point 401 would be y sin(π/2−θ2), and the vertical distance between the reflection point 401 and the terminal apparatus 20 would be (d2−y)sin(π/2−φ2). Therefore, using cosine theorem, the distance z between the terminal apparatus 20 and the base station 10 can be solved with the following equation:

$$z^2 = x^2 + (d_1-x)^2 + 2x(d_1-x)\cos(\pi-\theta_1-\varphi_1) = y^2 + (d_2-y)^2 + 2y(d_2-y)\cos(\pi-\theta_2-\varphi_2)$$

Referring to FIG. 4D, the signals 351 and 352 belong to the double-signal opposite-direction reflected path type. If the distance between the terminal antennae 21 and 22 of the terminal apparatus 20 is ignored, then the terminal apparatus 20, the base station 10 and the reflection point 401 of the obstruction 40 and the reflection point 401' of the obstruction 40' form two three-side congruent triangles (SSS) respectively. Since the AoD φ1, the AoD θ1 and the ToF of the signal 351 are known, the distance d1 of the signal 351 can first be calculated. Assuming the distance of the signal 351 between the base station 10 and the reflection point 401' is x, then the distance of the signal 351 between the reflection point 401' and the terminal apparatus 20 would be d1−x, and the horizontal distance between the base station 10 and the reflection point 401 would be x cos(π/2−θ1), and the horizontal distance between the reflection point 401' and the terminal apparatus 20 would be (d1−x)cos(π/2−φ1); similarly, the total distance of the signal 352 is d2, assuming the distance of the signal 352 between the base station 10 and the reflection point 401 is y, then the distance of the signal 352 between the reflection point 401 and the terminal apparatus 20 would be d2−y, and the horizontal distance between the base station 10 and the reflection point 401 would be y cos(π/2−θ2), and the horizontal distance between the reflection point 401 and the terminal apparatus 20 would be (d2−y)cos(π/2−φ2). Therefore, using cosine theorem, the distance z between the two reflection points 401 and 401' can be solved with the following equation:

$$z^2 = x^2 + y^2 + 2xy \cos(\theta_1+\theta_2) = (d_1-x)^2 + (d_2-y)^2 + 2(d_1-x)(d_2-y)\cos(\varphi_1+\varphi_2)$$

After the position information of the terminal apparatus 20 relative to the base station 10 is calculated by the positioning module 34 of the positioning device 30, the positioning device 30 returns this position information back to the terminal apparatus 20 for further use by the terminal apparatus 20. The way in which the position information is represented may be relative coordinates of the terminal apparatus 20 with respect to the base station 10, or absolute coordinates; the present disclosure is not limited as such.

In an embodiment, the positioning device 30 may not determine the position information after just a single calculation, rather a plurality of calculations are made before the average of the obtained calculations is used as the position information.

Figure 7:
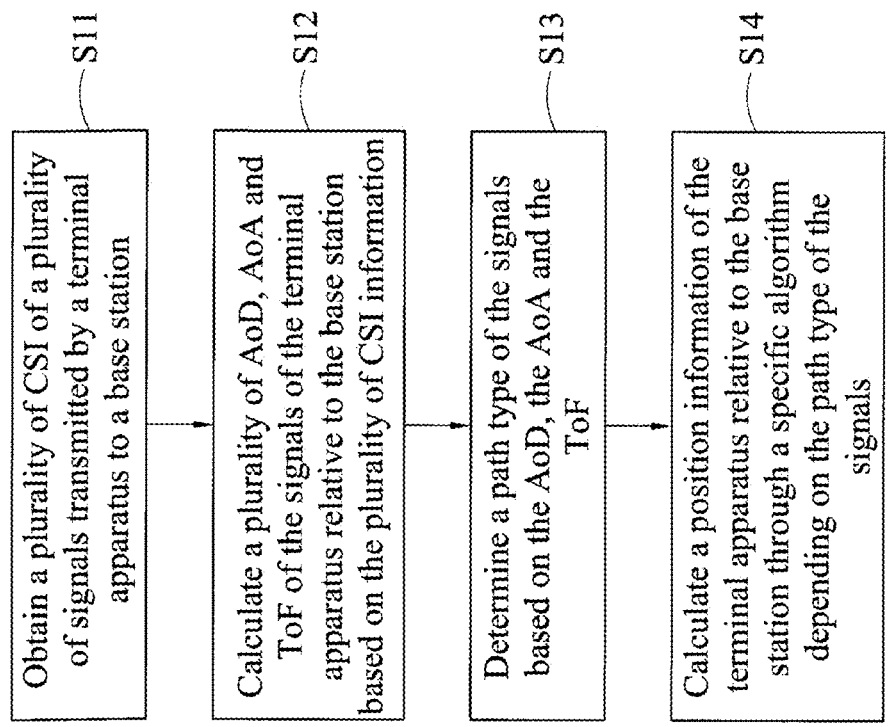
FIG. 7 is a flowchart illustrating a positioning method in accordance with the present disclosure.

Referring to FIG. 7, a channel-based positioning method is further disclosed. In step S11, a plurality of channel state information (CSI) of a plurality of signals transmitted by a terminal apparatus to a base station are obtained. Then, proceed to step S12. In step S12, a plurality of angles of departure (AoD), angles of arrival (AoA) and time of flight (ToF) of the plurality of signals are calculated based on the plurality of CSI information. Then, proceed to step S13. In step S13, the type of path of the plurality of signals is determined based on the plurality of AoD, AoA and ToF. Then, proceed to step S14. In step S14, a position information of the terminal apparatus relative to the base station is calculated through a specific algorithm depending on the type of path of the plurality of signals.

Figure 8:
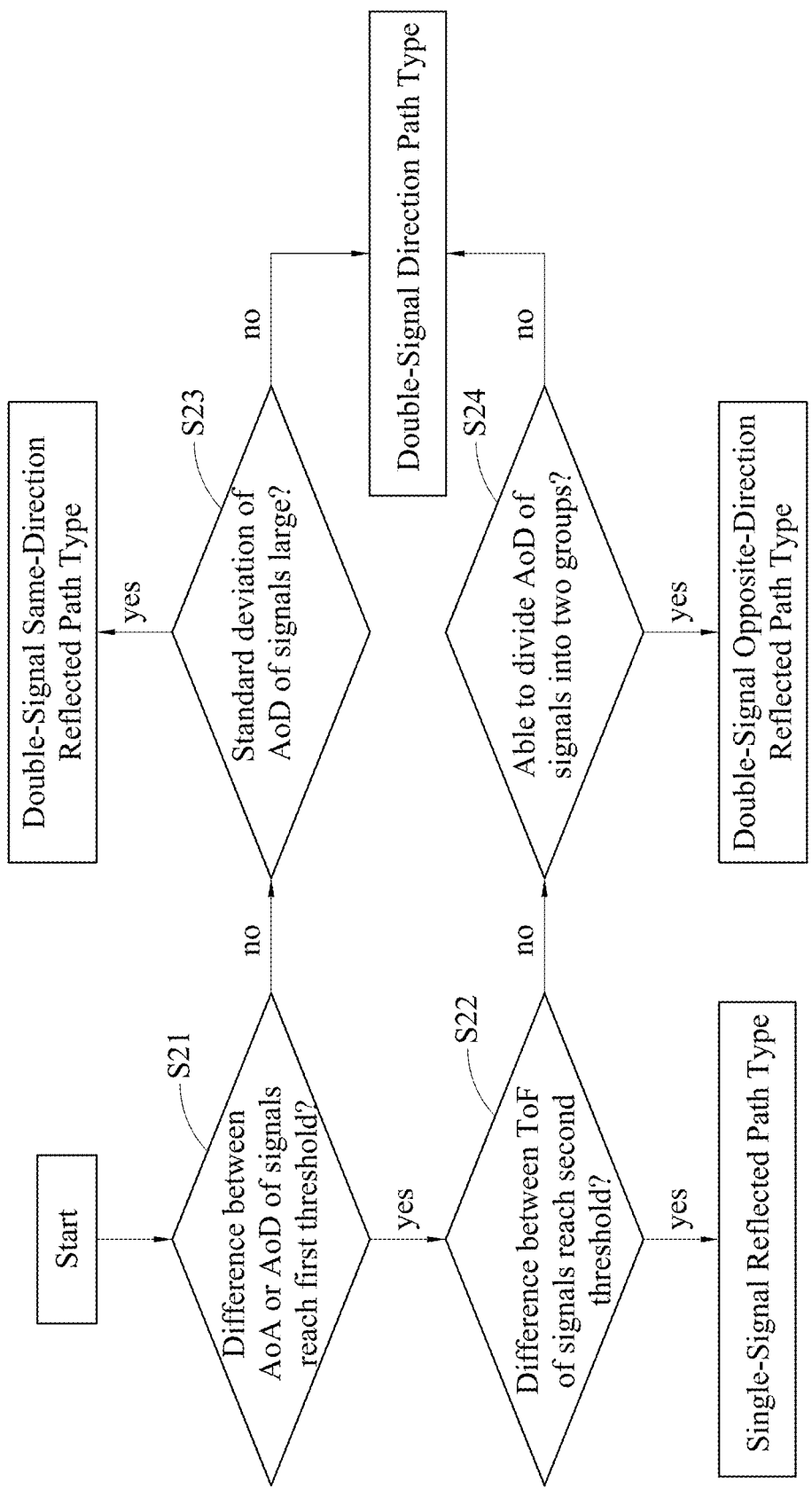
FIG. 8 is a flowchart illustrating determining a path type of the signals in the positioning method in accordance with the present disclosure.

In an embodiment, the step of determining the type of path of the plurality of signals in step S13 can further include step S21 to S24 described with respect to FIG. 8.

The technical details of above steps S11 to S14 and steps S21 to S24 of the positioning method of the present disclosure are substantially the same as the above descriptions with respect to the positioning system 1, and will not be repeated.

Figure 9:
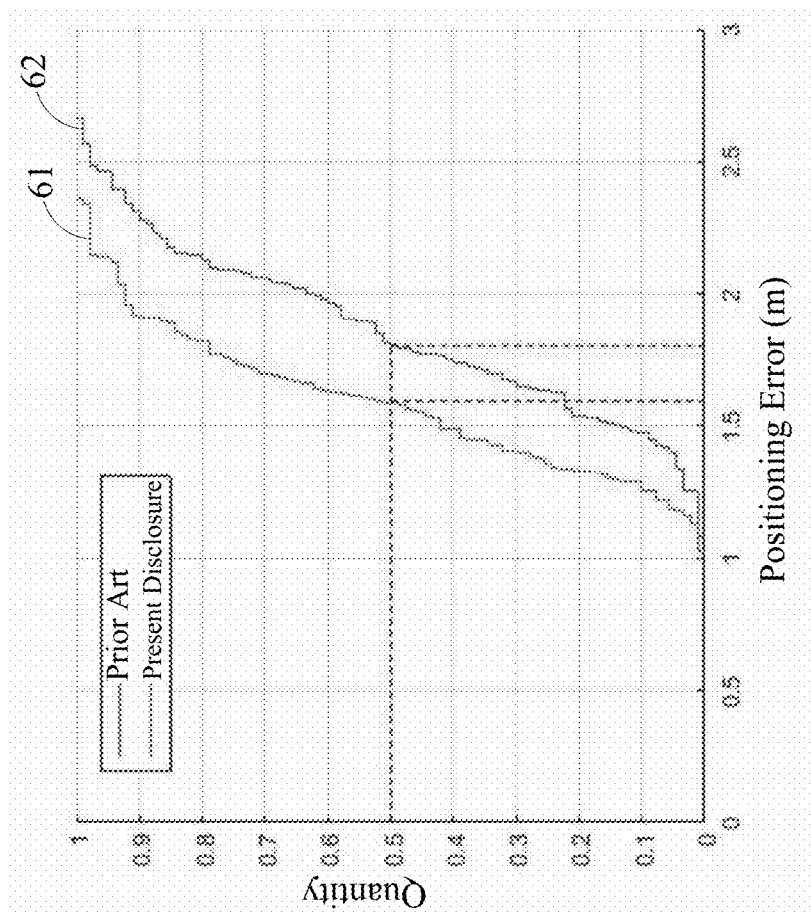
FIG. 9 is a schematic diagram illustrating a comparison between the positioning methods of present disclosure and the prior art.

Referring further to FIG. 9, a schematic diagram depicting a comparison between the positioning methods of the present disclosure and the prior art. A curve 61 indicates measurement results obtained using the technique of the present disclosure, while curve 62 indicates measurement results obtained using the technique of the prior art. As can be seen in FIG. 9, the positioning error of the present disclosure (curve 61) is significantly smaller than that of the prior art (curve 62). Therefore, the present disclosure is indeed capable of providing more accurate positioning results compared to the prior art.

With the positioning device, the positioning system and the positioning method according to the present disclosure, positioning information of a terminal apparatus can be obtained with just a single base station by first calculating the AoD, the AoA and the ToF of the signals transmitted by different terminal antennae of the terminal apparatus to the base station, determining the path type of the signals, and then determining the positioning information of the terminal apparatus relative to the base station by a specific algorithm depending on the path types. Therefore, the positioning technique according to the present disclosure is based on a terminal apparatus with at least two antennae. Compared to the prior art in which three base stations are needed for positioning, the present disclosure using just a single base station is able to provide smaller positioning errors and higher accuracy, satisfying the requirements for indoor positioning. It also eliminates the need to re-measure the signal strengths due to a change in the indoor environment as encountered in the prior art.

The above embodiments are only used to illustrate the principles of the present disclosure, and should not be construed as to limit the present disclosure in any way. The above embodiments can be modified by those with ordinary skill in the art without departing from the scope of the present disclosure as defined in the following appended claims.

What is claimed is:

1. A channel-based positioning device, comprising:
   a receiving module configured for receiving a plurality of channel state information (CSI) of a plurality of signals transmitted by a terminal apparatus to a base station, wherein the terminal apparatus includes at least two terminal antennae, and the base station includes at least two base station antennae;
   a calculating module configured for calculating a plurality of angles of departure (AoD), a plurality of angles of arrival (AoA) and a plurality of time of flight (ToF) of the plurality of signals of the terminal apparatus relative to the base station based on the plurality of signals comprising the CSI;
   a path type determining module configured for determining a path type of the plurality of signals based on the plurality of AoD, the plurality of AoA and the plurality of ToF and determining whether a first difference between the AoA or the AoD of signals from any two of the at least two terminal antennae reaches a first threshold, whether a second difference between the ToF of the signals from the two terminal antennae reaches a second threshold, whether the AoD of the two terminal antennae has a greater one or a less one of different standard deviations, or whether the AoD of the two terminal antennae are dividable in two groups or not; and
   a positioning module configured for calculating position information of the terminal apparatus relative to the base station based on the path type of the plurality of signals.

2. The channel-based positioning device of claim 1, wherein the plurality of AoA are calculated based on phase differences between signals transmitted respectively from one of the at least two terminal antennae to any two of the at least two base station antennae.

3. The channel-based positioning device of claim 1, wherein the plurality of AoD are calculated based on phase differences between signals transmitted respectively from any two of the at least two terminal antennae to one of the at least two base station antennae.

4. The channel-based positioning device of claim 1, wherein the plurality of ToF are calculated based on phase differences between sub-carriers of a signal transmitted from one of the at least two terminal antennae to one of the at least two base station antennae.

5. The channel-based positioning device of claim 1, wherein when the first difference between the AoA or the AoD of signals from any two of the at least two terminal antennae reaches the first threshold and the second difference between the ToF of the signals from the two terminal antennae reaches the second threshold, the path type determining module determines that the path type of the signals belong to a single-signal reflected path type, and the positioning module calculates the position information using an angle-side-angle triangle congruence theorem.

6. The channel-based positioning device of claim 1, wherein when the first difference between the AoA or the AoD of signals from any two of the at least two terminal antennae has not reached the first threshold and the AoD of the two terminal antennae has the greater one of different standard deviations, the path type determining module determines that the path type of the signals belong to a double-signal same-direction reflected path type, and the positioning module calculates the position information using a side-side-side triangle congruence theorem.

7. The channel-based positioning device of claim 1, wherein when the first difference between the AoA or the AoD of signals from any two of the at least two terminal antennae reaches the first threshold, the second difference between the ToF of the signals from the two terminal antennae has not reached the second threshold and the AoD of the two terminal antennae are dividable into two groups, the path type determining module determines that the path type of the signals belong to a double-signal opposite-direction reflected path type, and the positioning module calculates the position information using a side-side-side triangle congruence theorem.

8. The channel-based positioning device of claim 1, wherein when the first difference between the AoA or the AoD of signals from any two of the at least two terminal antennae reaches the first threshold, the second difference between the ToF of the signals from the two terminal antennae has not reached the second threshold and the AoD of the two terminal antennae are not dividable into two groups, or when the first difference between the AoA or the AoD of the signals from the two terminal antennae has not reached the first threshold and the AoD of the two terminal antennae has the less one of different standard deviations, the path type determining module determines that the path type of the signals belong to a double-signal direct path type, and the positioning module calculates the position information using a right angle-hypotenuse-side triangle congruence theorem.

9. A channel-based positioning system, comprising:
a base station including at least two base station antennae;
a terminal apparatus including at least two terminal antennae and configured for transmitting a plurality of signals to the base station for the base station to obtain a plurality of channel state information (CSI); and
a positioning device, including:
    a receiving module configured for receiving the plurality of CSI;
    a calculating module configured for calculating a plurality of angles of departure (AoD), a plurality of angles of arrival (AoA) and a plurality of time of flight (ToF) of the plurality of signals of the terminal apparatus relative to the base station based on the plurality of signals comprising the CSI;
    a path type determining module configured for determining a path type of the plurality of signals based on the plurality of AoD, the plurality of AoA and the plurality of ToF and determining whether a first difference between the AoA or the AoD of signals from any two of the at least two terminal antennae reaches a first threshold, whether a second difference between the ToF of the signals from the two terminal antennae reaches a second threshold, whether the AoD of the two terminal antennae has a greater one or a less one of different standard deviations, or whether the AoD of the two terminal antennae are dividable in two groups or not; and
    a positioning module configured for calculating position information of the terminal apparatus relative to the base station based on the path type of the plurality of signals.

10. The channel-based positioning system of claim 9, wherein the plurality of AoA are calculated based on phase differences between signals transmitted respectively from one of the at least two terminal antennae to any two of the at least two base station antennae.

11. The channel-based positioning system of claim 9, wherein the plurality of AoD are calculated based on phase differences between signals transmitted respectively from any two of the at least two terminal antennae to one of the at least two base station antennae.

12. The channel-based positioning system of claim 9, wherein the plurality of ToF are calculated based on phase differences between sub-carriers of a signal transmitted from one of the at least two terminal antennae to one of the at least two base station antennae.

13. The channel-based positioning system of claim 9, wherein when the first difference between the AoA or the AoD of signals from any two of the at least two terminal antennae reaches the first threshold and the second difference between the ToF of the signals from the two terminal antennae reaches the second threshold, the path type determining module determines that the path type of the signals belong to a single-signal reflected path type, and the positioning module calculates the position information using an angle-side-angle triangle congruence theorem.

14. The channel-based positioning system of claim 9, wherein when the first difference between the AoA or the AoD of signals from any two of the at least two terminal antennae has not reached the first threshold and the AoD of the two terminal antennae has the greater one of different standard deviations, the path type determining module determines that the path type of the signals belong to a double-signal same-direction reflected path type, and the positioning module calculates the position information using a side-side-side triangle congruence theorem.

15. The channel-based positioning system of claim 9, wherein when the first difference between the AoA or the AoD of signals from any two of the at least two terminal antennae reaches the first threshold, the second difference between the ToF of the signals from the two terminal antennae has not reached the second threshold and the AoD of the two terminal antennae are dividable into two groups, the path type determining module determines that the path type of the signals belong to a double-signal opposite-direction reflected path type, and the positioning module calculates the position information using a side-side-side triangle congruence theorem.

16. The channel-based positioning system of claim 9, wherein when the first difference between the AoA or the AoD of signals from any two of the at least two terminal antennae reaches the first threshold, the first difference between the ToF of the signals from the two terminal antennae has not reached the second threshold and the AoD of the two terminal antennae are not dividable into two groups, or when the first difference between the AoA or the AoD of the signals from the two terminal antennae has not reached the first threshold and the AoD of the two terminal antennae has the less one of different standard deviations, the path type determining module determines that the path type of the signals belong to a double-signal direct path type, and the positioning module calculates the position information using a right angle-hypotenuse-side triangle congruence theorem.

17. A channel-based positioning method, comprising:
obtaining a plurality of channel state information (CSI) of a plurality of signals transmitted by a terminal apparatus to a base station, wherein the terminal apparatus includes at least two terminal antennae, and the base station includes at least two base station antennae;
calculating a plurality of angles of departure (AoD), a plurality of angles of arrival (AoA) and a plurality of time of flight (ToF) of the plurality of signals of the terminal apparatus relative to the base station based on the plurality of signals comprising the CSI;

determining a path type of the plurality of signals based on the plurality of AoD, the plurality of AoA and the plurality of ToF and determining whether a first difference between the AoA or the AoD of signals from any two of the at least two terminal antennae reaches a first threshold, whether a second difference between the ToF of the signals from the two terminal antennae reaches a second threshold, whether the AoD of the two terminal antennae has a greater one or a less one of different standard deviations, or whether the AoD of the two terminal antennae are dividable in two groups or not; and calculating position information of the terminal apparatus relative to the base station based on the path type of the plurality of signals.

18. The channel-based positioning method of claim 17, wherein the plurality of AoA are calculated based on phase differences between signals transmitted respectively from one of the at least two terminal antennae to any two of the at least two base station antennae.

19. The channel-based positioning method of claim 17, wherein the plurality of AoD are calculated based on phase differences between signals transmitted respectively from any two of the at least two terminal antennae to one of the at least two base station antennae.

20. The channel-based positioning method of claim 17, wherein the plurality of ToF are calculated based on phase differences between sub-carriers of a signal transmitted from one of the at least two terminal antennae to one of the at least two base station antennae.

21. The channel-based positioning method of claim 17, further comprising when the first difference between the AoA or the AoD of signals from any two of the at least two terminal antennae reaches the first threshold and the second difference between the ToF of the signals from the two terminal antennae reaches the second threshold, determining that the path type of the signals belong to a single-signal reflected path type, and calculating the position information using an angle-side-angle triangle congruence theorem.

22. The channel-based positioning method of claim 17, further comprising when the first difference between the AoA or the AoD of signals from any two of the at least two terminal antennae has not reached the first threshold and the AoD of the two terminal antennae has the greater one of different standard deviations, determining that the path type of the signals belong to a double-signal same-direction reflected path type, and calculating the position information using a side-side-side triangle congruence theorem.

23. The channel-based positioning method of claim 17, further comprising when the first difference between the AoA or the AoD of signals from any two of the at least two terminal antennae reaches the first threshold, the second difference between the ToF of the signals from the two terminal antennae has not reached the second threshold and the AoD of the two terminal antennae are dividable into two groups, determining that the path type of the signals belong to a double-signal opposite-direction reflected path type, and calculating the position information using a side-side-side triangle congruence theorem.

24. The channel-based positioning method of claim 17, further comprising when the first difference between the AoA or the AoD of signals from any two of the at least two terminal antennae reaches the first threshold, the second difference between the ToF of the signals from the two terminal antennae has not reached the second threshold and the AoD of the two terminal antennae are not dividable into two groups, or when the first difference between the AoA or the AoD of the signals from the two terminal antennae has not reached the first threshold and the AoD of the two terminal antennae has the less one of different standard deviations, determining that the path type of the signals belong to a double-signal direct path type, and calculating the position information using a right angle-hypotenuse-side triangle congruence theorem.

* * * * *